United States Patent [19]
Olsen

[11] 4,442,647
[45] Apr. 17, 1984

[54] SOUNDPROOFING PANEL MOUNTED TO EFFECT VIBRATION ISOLATION

[75] Inventor: Eric G. Olsen, Woodbury, Conn.

[73] Assignee: United Technologies Corporation, Hartford, Conn.

[21] Appl. No.: 395,166

[22] Filed: Jul. 6, 1982

[51] Int. Cl.³ .............................................. E04B 1/62
[52] U.S. Cl. ...................................... 52/393; 52/506; 244/119
[58] Field of Search ................. 52/402, 403, 506, 787, 52/508, 393, 347; 244/131, 132, 119; 248/632, 634, 635; 403/224, 220

[56] References Cited

U.S. PATENT DOCUMENTS 2,263,919  11/1941  Darragh, Jr. ...................... 52/206 X
2,351,725   6/1944  Wauk ................................... 248/635
2,877,970   3/1959  Albertine et al. .................... 244/119
2,912,724  11/1959  Wilkes ............................... 52/393 X
2,925,050   2/1960  Candlin, Jr. et al. ........... 244/119 X Primary Examiner—Carl D. Friedman
Attorney, Agent, or Firm—Vernon F. Hauschild

[57] ABSTRACT

A rigid soundproofing panel is supported from a vibration-prone wall through a support system which includes an elastomeric plate isolator of selected spring rate to tune the suspension system so that minimal wall vibrations are imparted to the soundproofing panel, and a second elastomeric member in parallel with the first in the form of an acoustic edge seal extending between the wall and the soundproofing panel throughout the full periphery of the soundproofing panel so as to prevent acoustic flanking therebetween and being of substantially reduced spring rate as compared to that of the elastomeric plate isolator so as not to interfere with system tuning.

3 Claims, 1 Drawing Figure

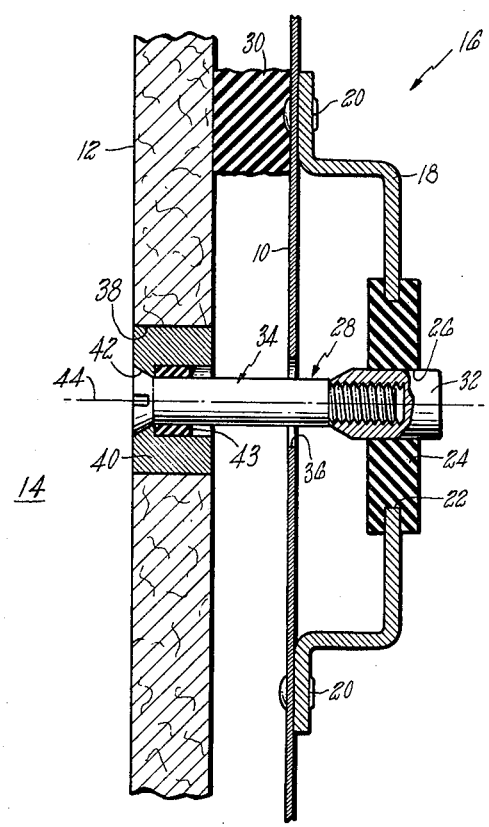

000# SOUNDPROOFING PANEL MOUNTED TO EFFECT VIBRATION ISOLATION

The Government has rights in this invention pursuant to Contract No. N00019-77-C-0202 awarded by the Department of the Navy.

DESCRIPTION

1. Technical Field

This invention relates to sound suppression and more particularly to the method of supporting rigid soundproof paneling from a vibration-prone structural wall so as to isolate maximally the panel from the vibrations to the wall.

2. Background Art

This invention is believed to be the only known method of supporting a soundproofing panel from a vibration-prone structural wall through elastomeric members connected in parallel from the wall to the panel, with the first elastomeric member being a plate isolator supporting the panel from the wall member and being of selected spring rate so as to tune the system for optimum vibration reduction, and the second elastomer member being an acoustic edge seal extending between the wall and the panel throughout the full periphery of the panel so as to prevent acoustic flanking, i.e. acoustic leakage, between the wall and the panel, and being of selected spring rate so as not to interfere with system tuning.

The prior art in the field of soundproofing, as exemplified by U.S. Pat. Nos. 2,912,724 to Wilkes, 2,263,919 to Darragh, and 2,877,970 to Albertine et al, is directed to the supporting of interior soundproofing panels from vibrating structures using conventional vibration isolators which include metal or elastomeric spring members to minimize or prevent the transmission of structure-borne sound from vibrating structures to aircraft cabin interiors or the like. However, the aforementioned prior art provide no positive means, either singularly or in combination with the isolating mounts, for minimizing or preventing "flanking" or acoustic edge leakage between the panels and the vibrating structure.

DISCLOSURE OF INVENTION

An object of this invention is to provide means for suspending a rigid soundproofing panel from a vibration-prone structural wall so that the panel is supported from the wall through an elastomeric plate isolator of selected spring rate to tune the system to effect vibration isolation of the panel from the wall, and a second elastomeric member forming an acoustic edge seal between the panel and the wall around the full periphery of the panel so as to prevent acoustic flanking therebetween and being of spring rate less than the plate isolator so as not to interfere with system tuning.

An important feature of my invention is that the elastomeric plate isolator and the elastomeric acoustic edge seal are positioned in parallel relationship between the wall and the panel.

Other features and advantages will be apparent from the specification and claims and from the accompanying drawings which illustrate an embodiment of the invention.

BRIEF DESCRIPTION OF DRAWING

The single FIGURE drawing is a cross-sectional, partial showing illustrating the apparatus to support a rigid soundproofing panel from a vibration-prone structural wall so as to impart minimal wall vibration to the panel.

BEST MODE FOR CARRYING OUT THE INVENTION

Viewing the single FIGURE drawing, we see vibration-prone structural wall 10, which may be a helicopter fuselage wall or similar vibration-prone structure. Rigid soundproofing panel 12, which may be a flat rectangle or of any desired shape, is supported in spaced relationship to wall 10. If wall 10 is a helicopter fuselage wall, panel 12 is positioned inboard or on the passenger side thereof and serves to prevent or minimize the amount of wall vibration which is imparted through panel 12 into the interior 14 of the helicopter. Panel 12 is supported from wall 10 by at least one vibration absorbing support assembly 16, each of which includes a back mounted bracket 18 which is connected in conventional fashion either by brackets or welding to wall 10 throughout its full periphery, for example, at connecting points 20. Bracket 18 includes a central aperture 22. Bracket 18 receives and supports elastomeric plate isolator 24 in aperture 22. Plate isolator 24 has central aperture 26 therein to receive in supporting relationship one end of connecting means 28.

Elastomeric acoustic edge seal 30, which is preferably one piece, extends between the adjacent surfaces of wall 10 and panel 12 throughout the full periphery of panel 12 and, as installed, will prevent acoustic flanking between the wall and the panel.

Connecting means 28 includes first cylindrical member 32, which is secured in any conventional fashion, such as molding or threading, into aperture 26 of the elastomeric plate isolator 24 and which has internal threading. Connecting means 28 also includes externally threaded screw member 34 which extends through aligned apertures 36 and 38 in wall 10 and panel 12, respectively. Ring-shaped grommet or bushing 40 is shaped to be press fitted or otherwise received in conventional fashion in aperture 38 of panel 12 and is shaped on its inner surface to matingly engage screw member 34 along conical interface 42. Ring seal 43 seals between bushing 40 and member 28.

Preferably, plate isolator 24, bracket 18, and apertures 22, 26, 36 and 38 are of circular cross section and, together with connecting means 28, are positioned concentrically about axis 44.

It will be noted that as screw 34 is turned into threaded receptacle 32, elastomeric edge seal 30 is compressed and panel 12 is supported from wall member 10.

It is a very important teaching of my invention that elastomeric plate isolator 24 be selected to have a spring rate which permits it to tune support system 16 so that minimal or no wall vibrations are imparted therethrough to panel 12. It is also important to my invention that elastomeric acoustic edge seal 30 is positioned in parallel relationship with plate isolator 24 between wall 10 and panel 12 and that connecting means 28 is of a selected length such that when screw member 34 is turned into threaded receptacle 32, the thickness of then compressed edge seal 30 results in the edge seal 30 having a spring rate considerably less than the spring rate of plate isolator 24 so that edge seal 30 does not interfere with the tuning of suspension system 16.

It will therefore be seen that in my construction as shown in the attached drawing, soundproofing panel 12 is supported from vibration-prone structural wall 10 by suspension system 16 which includes elastomeric plate isolator 24 of selected spring rate to tune system 16 so that minimal wall vibrations pass therethrough and are imparted to panel 12, and further so that elastomeric acoustic edge seal 30 prevents the acoustic flanking of vibrations between wall 10 and panel 12 and, further, due to its lesser spring rate, that edge seal 30 does not interfere with system tuning.

It should be understood that the invention is not limited to the particular embodiment shown and described herein, but that various changes and modifications may be made without departing from the spirit and scope of this novel concept as described in the following claims.

I claim:

1. In combination:
   a vibration prone wall member,
   a rigid soundproofing panel adapted to be supported in spaced relation to said wall,
   means to support said soundproofing panel from said wall while providing vibration isolation therebetween comprising:
   elastomeric gasket means extending between said wall and said rigid soundproofing panel and extending throughout the full periphery of said panel, yet to prevent acoustic flanking between the wall and the panel,
   an attachment bracket member attached to said wall,
   an elastic plate isolator supported from an aperture in the said center of said bracket member so as to extend substantially parallel to said wall and being of selected spring rate to tune the support means so that minimal wall vibration is imparted therethrough to said panel,
   a connecting member extending through aligned apertures in said wall and said soundproofing panel and connected to said plate isolator so as to support said soundproofing panel from said wall through said bracket member and said plate isolator, and being of selected length when in installed condition to selectively compress said elastomeric gasket means to a thickness at which it has a spring rate less than the plate isolator spring rate so as not to affect support means tuning.

2. Apparatus according to claim 1 wherein said connecting means comprises an internally threaded cylindrical member connected to and extending substantially perpendicular from said plate isolator toward said panel, and an externally threaded screw member extending through said panel aperture and threadably connecting to the internal threads of the cylindrical member and coacting therewith to support said panel from said plate isolator and to compress said elastomeric gasket to its desired thickness and spring rate.

3. Apparatus according to claim 2 wherein said panel, said wall and said elastomeric plate isolator are positioned in spaced parallel relationship, and wherein said bracket member, said plate isolator, said connecting member, and said wall and panel apertures are of circular cross section and concentric about the axis of the connecting member.

* * * * *

UNITED STATES PATENT AND TRADEMARK OFFICE
CERTIFICATE OF CORRECTION

PATENT NO. : 4,442,647
DATED : April 17, 1984
INVENTOR(S) : Eric G. Olsen

It is certified that error appears in the above-identified patent and that said Letters Patent is hereby corrected as shown below:

Column 3, Line 25    Delete ", yet"

Signed and Sealed this

Second Day of October 1984

[SEAL]

Attest:

GERALD J. MOSSINGHOFF

*Attesting Officer*    *Commissioner of Patents and Trademarks*